(12) United States Patent
Tsai

(10) Patent No.: US 8,730,444 B2
(45) Date of Patent: May 20, 2014

(54) PIXEL ARRAY STRUCTURE

(75) Inventor: Ming-Han Tsai, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 653 days.

(21) Appl. No.: 12/982,850

(22) Filed: Dec. 30, 2010

(65) Prior Publication Data

US 2012/0099068 A1  Apr. 26, 2012

(30) Foreign Application Priority Data

Oct. 22, 2010 (TW) ................................ 99136136 A (51) Int. Cl.
   G02F 1/1343      (2006.01)
   G02F 1/1335      (2006.01)

(52) U.S. Cl.
   CPC .... *G02F 1/134336* (2013.01); *G02F 1/133514* (2013.01)
   USPC .......................................... 349/143; 349/106

(58) Field of Classification Search
   CPC ................... G02F 1/134336; G02F 1/133514; G09G 3/3648
   USPC ................. 349/42, 106, 139–144; 345/87, 92
   See application file for complete search history.

(56) References Cited

U.S. PATENT DOCUMENTS 8,344,990 B2 *  1/2013  Chen et al. .................... 345/100

FOREIGN PATENT DOCUMENTS

TW    201027208    7/2010
TW    201035655   10/2010

OTHER PUBLICATIONS

"Office Action of Taiwan Counterpart Application", issued on Aug. 28, 2013, p. 1-p. 7.

* cited by examiner

*Primary Examiner* — Uyen Chau N Le
*Assistant Examiner* — Michael Mooney
(74) *Attorney, Agent, or Firm* — Jiang Chyun IP Office (57) ABSTRACT

A pixel array structure including a plurality of first pixels, second pixels, third pixels, a plurality of scan lines and a plurality of data lines is provided. The first pixels are arranged in a first row. The second pixels are arranged in a second row. The third pixels are arranged in a third row. The scan lines and the data lines are electrically connected to the corresponding first pixels, second pixels and third pixels. A first pixel column and a second pixel column are respectively formed at two sides of each data line. The first pixels, the second pixels, and the third pixels in the first pixel column are connected to the scan lines of odd positions. The first pixels, the second pixels, and the third pixels in the second pixel column are connected to the scan lines of even positions.

4 Claims, 6 Drawing Sheets

PIXEL ARRAY STRUCTURE

CROSS-REFERENCE TO RELATED APPLICATION

This application claims the priority benefit of Taiwan application serial no. 99136136, filed on Oct. 22, 2010. The entirety of the above-mentioned patent application is hereby incorporated by reference herein and made a part of this specification.

BACKGROUND

1. Field of the Invention

The invention relates to an array structure. Particularly, the invention relates to a pixel array structure.

2. Description of Related Art

In the highly competitive flat panel display industry, besides devoting to research and develop flat panel displays with superior performance, manufactures also make great efforts to reduce production cost, so as to increase profits and supply more affordable flat panel displays to the consumer market.

Taking a most widespread thin film transistor liquid crystal display (TFT LCD) as an example, methods for reducing production cost thereof are plural, and one method is to reduce a number of source driver integrated circuits (ICs) required in a follow-up module fabrication process by designing a pixel array structure, so as to reduce the production cost.

In detail, in a conventional pixel array structure design, by doubling the number of scan lines, in case that the number of data lines is reduced by a half, each pixel of the pixel array structure can still be independently operated. In this way, although a number of gate driver ICs required in the follow-up module fabrication process is doubled, the number of the high-cost source driver ICs required in the follow-up module fabrication process is also reduced by a half, so that fabrication cost of the TFT LCD can be reduced.

Another method for reducing the fabrication cost of the TFT LCD is to design sub pixels displaying a white color in the pixel array structure, so as to improve a transmittance of a display panel thereof. In this way, in the follow-up module fabrication process, backlight module materials (for example, light emitting diodes and brightness enhancement films, etc.) can be reduced, so as to further reduce the production cost of the TFT LCD.

Although the above methods can reduce the production cost of the TFT LCD, a benefit of cost reduction of the TFT LCD can still be greatly improved. Therefore, how to effectively reduce the production cost of the TFT LCD is an important issue to be achieved.

SUMMARY OF THE INVENTION

Accordingly, the invention is directed to a plurality of pixel array structures, by which fabrication cost of follow-up modules can be effectively reduced.

The invention provides a pixel array structure including a plurality of first pixels, a plurality of second pixels, a plurality of third pixels, a plurality of scan lines and a plurality of data lines. Each of the first pixels has an active device, and the first pixels are arranged in a first row. Each of the second pixels has an active device, and the second pixels are arranged in a second row. Each of the third pixels has an active device, and the third pixels are arranged in a third row. The scan lines and the data lines are electrically connected to the corresponding first pixels, second pixels and third pixels through the active devices. A first pixel column and a second pixel column are respectively formed at two sides of each data line. The first pixels, the second pixels, and the third pixels in the first pixel column are connected to the scan lines of odd positions. The first pixels, the second pixels, and the third pixels in the second pixel column are connected to the scan lines of even positions.

The invention provides a pixel array structure including a plurality of first pixels, a plurality of second pixels, a plurality of third pixels, a plurality of fourth pixels, a plurality of scan lines and a plurality of data lines. Each of the first pixels, the second pixels, the third pixels and the fourth pixels has an active device. The first pixels and the second pixels are arranged in interlace in a first row, and the third pixels and the fourth pixels are arranged in interlace in a second row. The scan lines and the data lines are electrically connected to the corresponding first pixels, second pixels, third pixels and fourth pixels through the active devices. A first pixel column and a second pixel column are respectively formed at two sides of each data line. The second pixels and the fourth pixels in the first pixel column are connected to the scan lines of even positions. The first pixels and the third pixels in the second pixel column are connected to the scan lines of odd positions.

The invention provides a pixel array structure including a plurality of first pixels, a plurality of second pixels, a plurality of third pixels, a plurality of fourth pixels, a plurality of scan lines and a plurality of data lines. Each of the first pixels, the second pixels, the third pixels and the fourth pixels has an active device. The first pixels and the second pixels are arranged in interlace in a first row, and the third pixels and the fourth pixels are arranged in interlace in a second row. The scan lines and the data lines are electrically connected to the corresponding first pixels, second pixels, third pixels and fourth pixels through the active devices. A first pixel row and a second pixel row are respectively formed at two sides of each scan line. The first pixels and the second pixels in the first pixel row are connected to the data lines of odd positions. The third pixels and the fourth pixels in the second pixel row are connected to the data lines of even positions.

The invention provides an active device array substrate including a substrate and a pixel array structure. The pixel array structure is disposed on the substrate, and the pixel array structure is any one of the aforementioned pixel array structures.

The invention provides a liquid crystal display panel including the aforementioned active device array substrate, a color filter substrate and a liquid crystal layer. The color filter substrate is opposite to the active device array substrate. The liquid crystal layer is disposed between the active device array substrate and the color filter substrate.

According to the above descriptions, by using the design of the pixel array structures of the invention, related materials used in follow-up module fabrication process can be effectively reduced, so as to reduce the fabrication cost of the follow-up modules.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1:
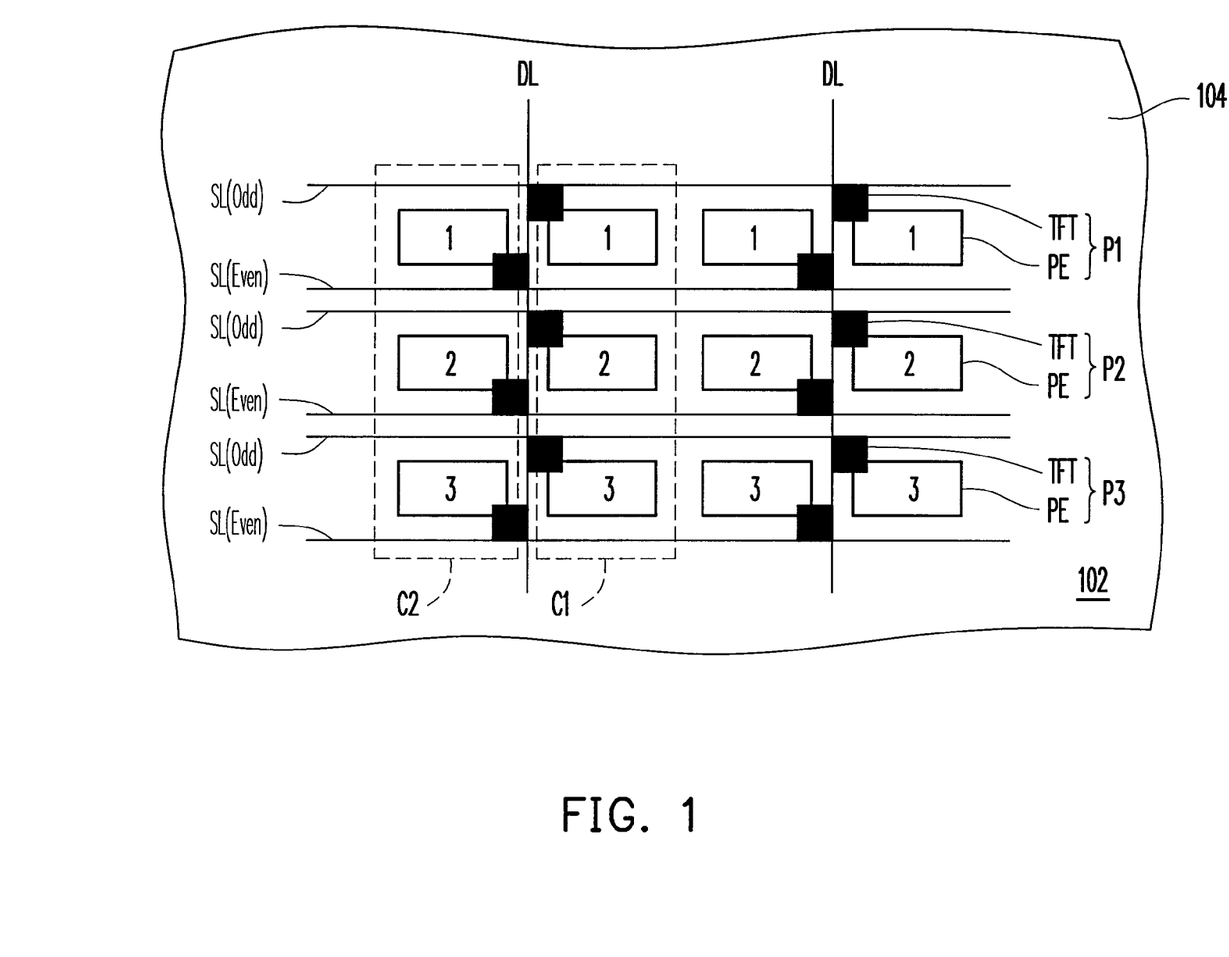
FIG. 1 is a schematic diagram illustrating a pixel array structure according to a first embodiment of the invention.

FIG. 1 is a schematic diagram illustrating a pixel array structure according to a first embodiment of the invention. Referring to FIG. 1, the pixel array structure 102 includes a plurality of first pixels, P1, a plurality of second pixels P2, a plurality of third pixels P3, a plurality of scan lines SL and a plurality of data lines DL. The pixel array structure 102 applies a RGB horizontal arrangement method.

Each of the first pixels P1, the second pixels P2 and the third pixels P3 has an active device TFT, as that shown in FIG. 1. The first pixels P1, the second pixels P2 and the third pixels P3 are electrically connected to the corresponding scan lines SL and the data lines DL through the respective active devices TFT. The active device TFT can be a thin film transistor including a gate (not shown), a source (not shown) and a drain (not shown). Moreover, each of the pixels P1, P2 and P3 may further include a pixel electrode PE electrically connected to the active device TFT. In detail, the active device TFT is electrically connected to the corresponding scan line SL through the gate (not shown), electrically connected to the corresponding data line DL through the source (not shown), and electrically connected to the corresponding pixel electrode PE through the drain (not shown), though the invention is not limited thereto, and the active device TFT can also be other suitable types of active device.

The scan lines SL and the data lines DL are generally fabricated by metal materials. However, the invention is not limited thereto, and the scan lines SL and the data lines DL can also be fabricated by other conductive materials, for example, alloy, nitride of metal materials, oxide of metal materials, nitrogen oxide of metal materials, or stacking layers of metal materials and other conductive materials, etc.

The pixel electrode PE is, for example, a transparent conductive layer including metal oxide, for example, indium tin oxide, indium zinc oxide, aluminium tin oxide, aluminium zinc oxide, indium germanium zinc oxide, or other suitable oxides or a stacking layer of at least two of the above metal oxides.

Referring to FIG. 1, the first pixels P1 are arranged in a first row, the second pixels P2 are arranged in a second row, and the third pixels P3 are arranged in a third row. It should be noticed that in the pixel array structure 102, the first pixels P1, the second pixels P2 and the third pixels P3 are all disposed along a horizontal direction (a long side of the pixel electrode PE is parallel to an extending direction of the scan line SL), and the first pixels P1, the second pixels P2 and the third pixels P3 are arranged along an extending direction of the data line DL. In this way, the first pixels P1, the second pixels P2 and the third pixels P3 in a same column may share a same data line DL. Compared to a conventional pixel array structure (a long side of the pixel electrode PE is parallel to an extending direction of the data line DL, and the first pixels P1, the second pixels P2 and the third pixels P3 are arranged along an extending direction of the scan line SL), a number of the data lines DL can be reduced to ⅓ of that of the conventional pixel array structure.

Moreover, a first pixel column C1 and a second pixel column C2 are respectively formed at two sides of each data line DL. It should be noticed that the first pixels P1, the second pixels P2 and the third pixels P3 in the first pixel column C1 and the second pixel column C2 at two sides of each data line DL are electrically connected to such data line DL. In other words, the first pixels P1, the second pixels P2 and the third pixels P3 at two sides of each data line DL share such data line DL. Therefore, the number of the data lines DL in the pixel array structure 102 can be further reduced by a half.

In the present embodiment, to ensure that the first pixels P1, the second pixels P2 and the third pixels P3 can be independently operated, the number of the scan lines SL is also increased. A connecting method of the scan lines SL and the pixels P1-P3 is as follows. The first pixels P1, the second pixels P2 and the third pixels P3 in the first pixel column C1 are respectively connected to the scan lines SL of odd positions. The first pixels P1, the second pixels P2 and the third pixels P3 in the second pixel column C2 are respectively connected to the scan lines SL of even positions. In this way, each of the pixels is electrically connected to a specific set of the scan line SL and the data line DL, so that each of the pixels can be independently operated.

It should be noticed that according to the arrangement method of the pixels P1, P2 and P3 and the method that the pixels P1, P2 and P3 at two sides of a same data lien DL share the same data line DL, the number of the data lines DL can be reduced to ⅙, and meanwhile the number of the scan lines SL is increased by 6 times. Although a number of gate driver integrated circuits (ICs) are increased, such problem can be mitigated according to a gate in panel (GIP) technique. Moreover, since a number of high-cost source driver ICs can be reduced to ⅙, in the follow-up module fabrication process, the cost of the source driver ICs can be effectively reduced.

Figure 2:
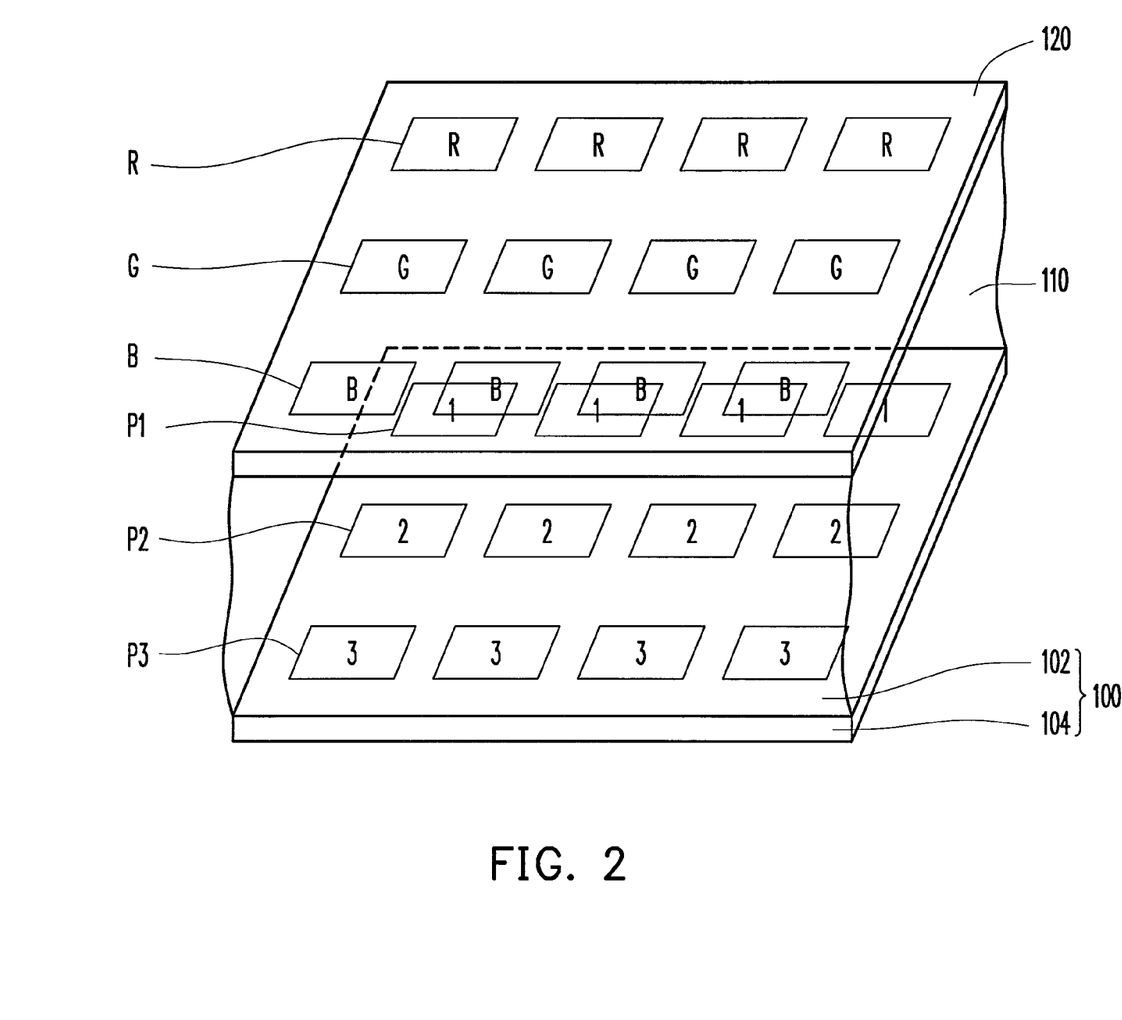
FIG. 2 is a schematic diagram illustrating an active device array substrate and a liquid crystal display (LCD) panel using the pixel array structure of FIG. 1.

FIG. 2 is a schematic diagram illustrating an active device array substrate and a liquid crystal display (LCD) panel using the pixel array structure 102 of FIG. 1. Referring to FIG. 2, the pixel array structure 102 can be fabricated on a substrate 104 to form an active device array substrate 100. The substrate 104 is used for carrying the pixel array structure 102, and a material thereof can be glass, quartz, organic polymers, opaque/reflective materials (for example, conductive materials, wafer, porcelain, or other suitable materials), or other suitable materials.

Referring to FIG. 2, the active device array substrate 100 can be applied in a LCD panel, and the LCD panel includes the active device array substrate 100, a color filter substrate 120 and a liquid crystal layer 110. The color filter layer 120 is opposite to the active device array substrate 100. The liquid crystal layer 110 is disposed between the active device array substrate 100 and the color filter substrate 120.

Red filter patterns R, green filter patterns G and blue filter patterns B of the color filter substrate 120 can respectively correspond to the first pixels P1, the second pixels P2 and the third pixels P3 in the pixel array structure 102, so that the first pixels P1, the second pixels P2 and the third pixels P3 respectively display a red color, a green color and a blue color.

According to the above descriptions, the number of the data lines DL in the pixel array structure 102 can be reduced to 1/6 of that of the conventional pixel array structure. In this way, in the active device array substrate 100 using the pixel array structure 102, the number of the source driver ICs used in the follow-up module fabrication process can be greatly reduced to 1/6 of that of the conventional pixel array structure, so as to greatly reduce the cost of the follow-up module fabrication process. The fabrication cost of the increased gate driver ICs can be effectively controlled according to the GIP technique. In this way, production cost of the active device array substrate and the LCD panel using the pixel array structure 102 of the present embodiment can be effectively reduced.

Second Embodiment

Figure 3:
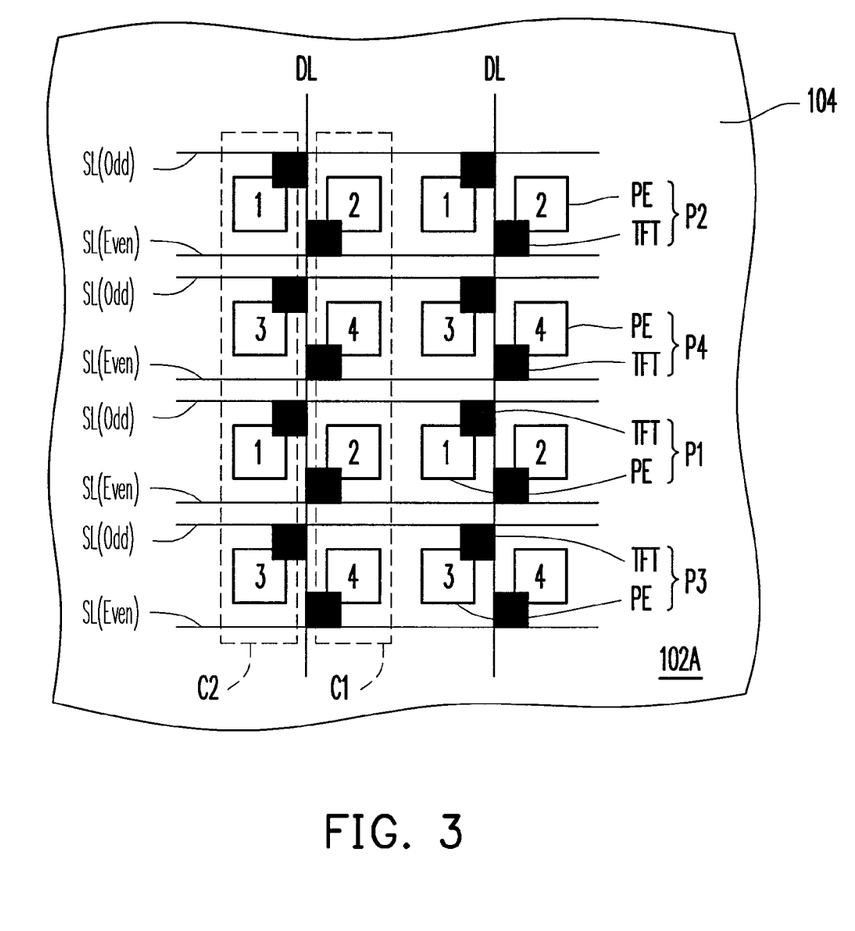
FIG. 3 is a schematic diagram illustrating a pixel array structure according to a second embodiment of the invention.

FIG. 3 is a schematic diagram illustrating a pixel array structure according to a second embodiment of the invention. Referring to FIG. 3, the pixel array structure 102A may include a plurality of first pixels P1, a plurality of second pixels P2, a plurality of third pixels P3, a plurality of fourth pixels P4, a plurality of scan lines SL and a plurality of data lines DL. The pixel array structure 102A applies a RGBW chessboard arrangement method.

Each of the first pixels P1, the second pixels P2, the third pixels P3 and the fourth pixels P4 has an active device TFT, as that shown in FIG. 3. The first pixels P1, the second pixels P2, the third pixels P3 and the fourth pixels P4 are electrically connected to the corresponding scan lines SL and the data lines DL through the respective active devices TFT.

Referring to FIG. 3, the first pixels P1 and the second pixels P2 are arranged in interlace in a first row, and the third pixels P3 and the fourth pixels P4 are arranged in interlace in a second row. A first pixel column C1 and a second pixel column C2 are respectively formed at two sides of each data line DL. It should be noticed that the second pixels P2, the fourth pixels P4 and the first pixels P1, the third pixels P3 in the first pixel column C1 and the second pixel column C2 at two sides of each data line DL are electrically connected to such data line DL. In other words, the first pixels P1, the second pixels P2, the third pixels P3 and the fourth pixels P4 at two sides of each data line DL share such data line DL. Therefore, one data line DL is used to simultaneously drive the first to the fourth pixels P1-P4, so that the number of the data lines DL in the pixel array structure 102A can be reduced by a half compared to that of the conventional RGBW pixel array structure.

To ensure that the first pixels P1, the second pixels P2, the third pixels P3 and the fourth pixels P4 can be independently operated, a number of the scan lines SL is also increased. A connecting method of the scan lines SL and the pixels P1-P4 is as follows. The second pixels P2 and the fourth pixels P4 in the first pixel column C1 are respectively connected to the scan lines SL of even positions. The first pixels P1 and the third pixels P3 in the second pixel column C2 are respectively connected to the scan lines SL of odd positions. In this way, each of the pixels P1-P4 is electrically connected to a specific set of the scan line SL and the data line DL, so that each of the pixels P1-P4 can be independently operated.

It should be noticed that in the present embodiment, to ensure each of the pixels can be independently operated, while the number of the data lines DL is reduced, the number of the scan lines SL is increased. Now, although the number of the gate driver ICs required in the follow-up module fabrication process is increased, such problem can be mitigated according to the GIP technique, so as to control the cost of the gate driver ICs.

Figure 4:
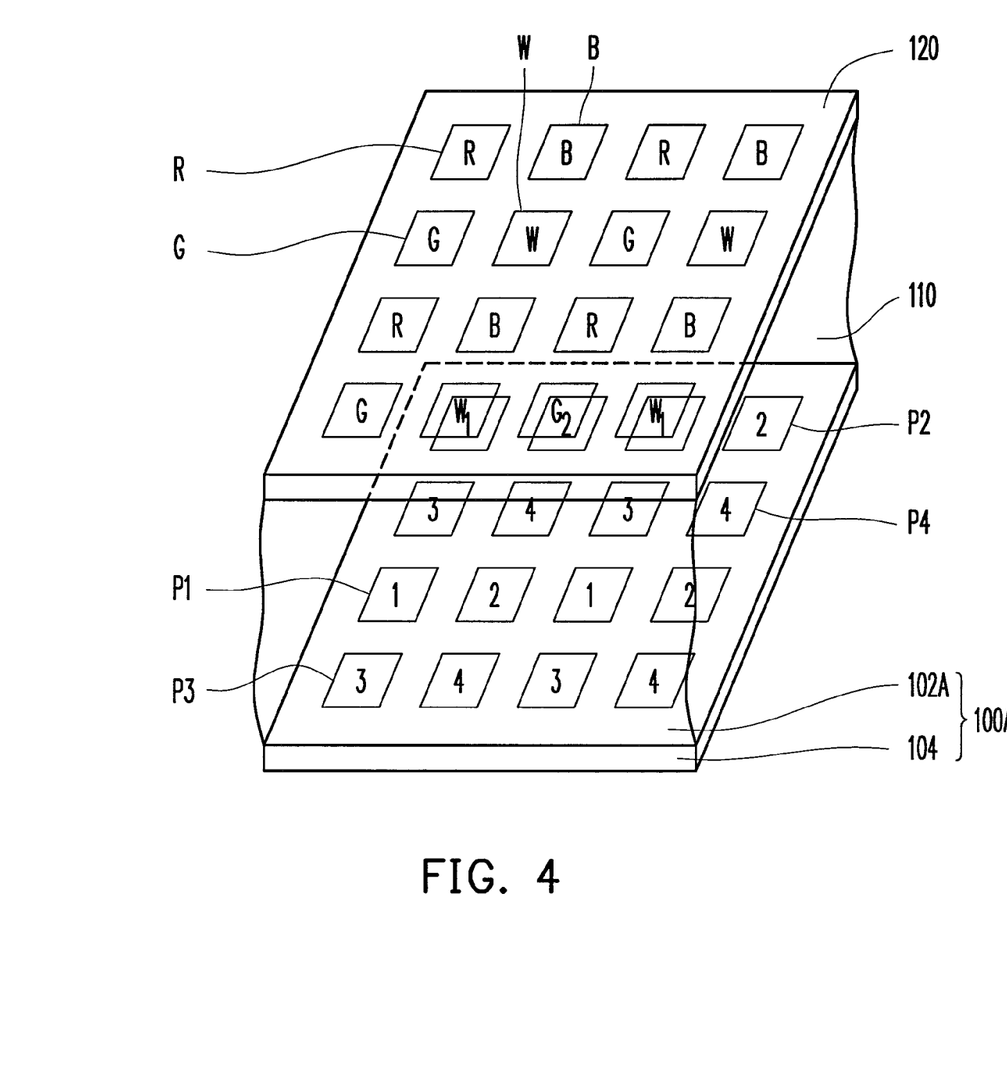
FIG. 4 is a schematic diagram illustrating an active device array substrate and a LCD panel using the pixel array structure of FIG. 3.

FIG. 4 is a schematic diagram illustrating an active device array substrate and a LCD panel using the pixel array structure of FIG. 3. Referring to FIG. 4, the pixel array structure 102A can be fabricated on a substrate 104 to form an active device array substrate 100A. Moreover, the active device array substrate 100A can be applied in a LCD panel, and the LCD panel includes the active device array substrate 100A, a color filter substrate 120 and a liquid crystal layer 110. The color filter layer 120 is opposite to the active device array substrate 100A. The liquid crystal layer 110 is disposed between the active device array substrate 100A and the color filter substrate 120.

Red filter patterns R, blue filter patterns B, green filter patterns G, and transparent filter patterns W of the color filter substrate 120 can respectively correspond to the first pixels P1, the second pixels P2, the third pixels P3 and the fourth pixels P4 in the pixel array structure 102A, so that the first pixels P1, the second pixels P2, the third pixels P3 and the fourth pixels P4 respectively display a red color, a blue color, a green color and a white color.

It should be noticed that the fourth pixels P4 correspond to the transparent filter patterns W, which avails improving a transmittance of the LCD panel, so that backlight module materials (for example, light emitting diodes and brightness enhancement films, etc.) required in the follow-up module fabrication process of the LCD panel can be reduced, so as to further reduce the production cost of the follow-up module fabrication process.

According to the above descriptions, the number of the data lines DL in the pixel array structure 102A can be reduced by a half compared to that of the conventional RGBW chessboard pixel array structure. Therefore, in the active device array substrate 100A using the pixel array structure 102A, the number of the source driver ICs used in the follow-up module fabrication process can be reduced to 1/2 of that of the conventional pixel array structure, so as to greatly reduce the cost of the follow-up module fabrication process. The fabrication cost of the increased gate driver ICs can be effectively controlled according to the GIP technique. In this way, production cost of the active device array substrate and the LCD panel using the pixel array structure 102A of the present embodiment can be effectively reduced.

Moreover, since the pixel array structure 102 of the present embodiment applies a design that the pixels P4 correspond to the transparent filter patterns W, light transmittance thereof is improved, so that backlight module materials (for example, light emitting diodes and brightness enhancement films, etc.) required in the follow-up module fabrication process of the LCD panel using the pixel array structure 102A can be reduced, so as to further reduce the production cost.

Third Embodiment

In the second embodiment, since the number of the scan lines SL is increased, when the LCD panel of the second embodiment is operated in a high scan frequency (for example, 120 hertz), each of the pixels may have a problem of inadequate charging time. Therefore, a pixel array structure of a third embodiment is provided to resolve the above problem.

Figure 5:
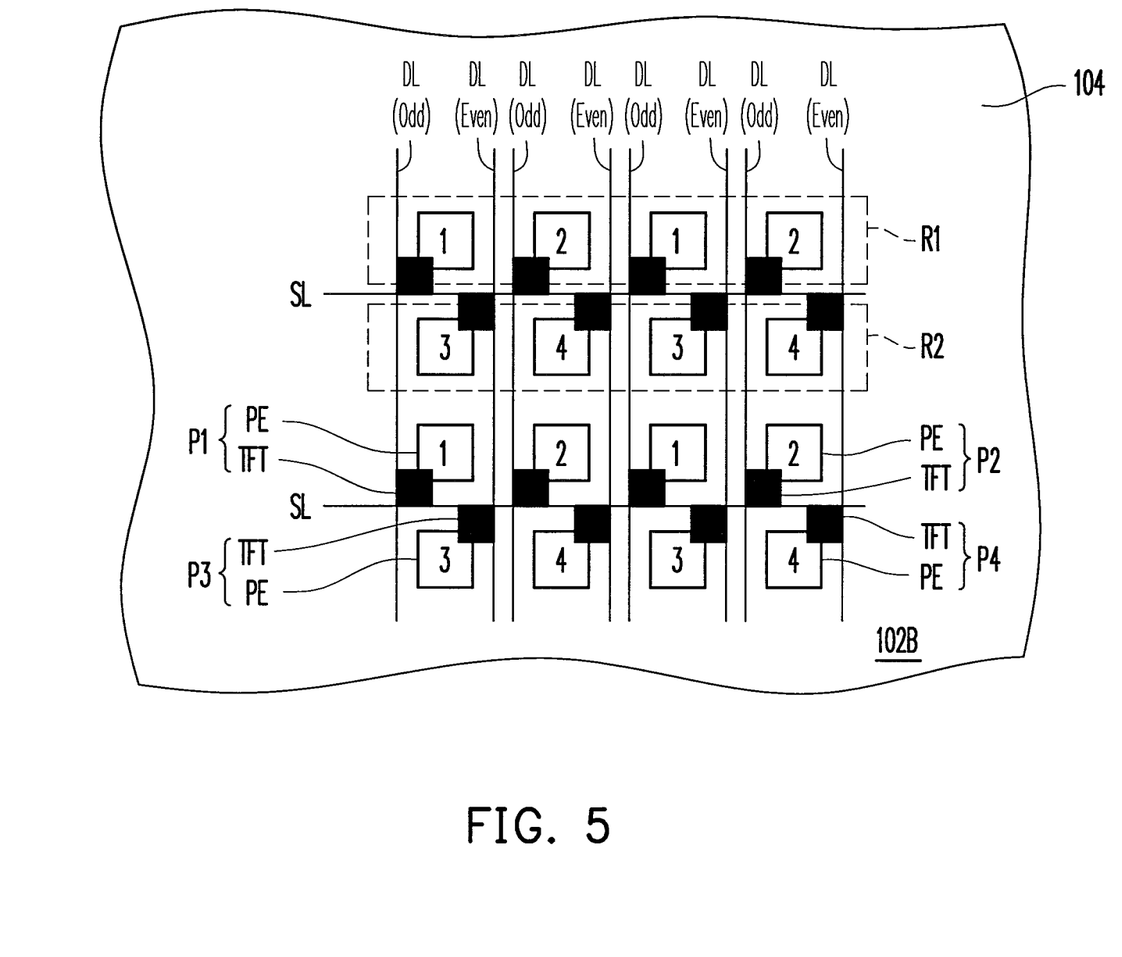
FIG. 5 is a schematic diagram illustrating a pixel array structure according to a third embodiment of the invention.

FIG. 5 is a schematic diagram illustrating a pixel array structure according to the third embodiment of the invention. Referring to FIG. 5, the pixel array structure 102B may include a plurality of first pixels P1, a plurality of second pixels P2, a plurality of third pixels P3, a plurality of fourth pixels P4, a plurality of scan lines SL and a plurality of data lines DL.

Each of the first pixels P1, the second pixels P2, the third pixels P3, the fourth pixels P4 has an active device TFT, as that shown in FIG. 5. The first pixels P1, the second pixels P2, the third pixels P3 and the fourth pixels P4 are electrically connected to the corresponding scan lines SL and the data lines DL through the respective active devices TFT.

Referring to FIG. 5, the first pixels P1 and the second pixels P2 are arranged in interlace in a first row, and the third pixels P3 and the fourth pixels P4 are arranged in interlace in a second row. A first pixel row R1 and a second pixel row R2 are respectively formed at two sides of each scan line SL. It should be noticed that the first pixels P1, the second pixels P2 and the third pixels P3, the fourth pixels P4 in the first pixel row R1 and the second pixel row R2 at two sides of each scan line SL are electrically connected to such scan line SL.

In other words, the first pixels P1, the second pixels P2, the third pixels P3 and the fourth pixels P4 at two sides of each scan line SL share such scan line SL. Therefore, the number of the scan lines SL in the pixel array structure 102B can be reduced by a half compared to that of the pixel array structure 102A of the second embodiment. In this way, the charging time of each of the pixels is doubled, so that the problem of inadequate charging time of each of the pixels P1-P4 is mitigated.

To ensure that the first pixels P1, the second pixels P2, the third pixels P3 and the fourth pixels P4 can be independently operated, a connecting method of the data lines DL and the pixels P1-P4 is as follows. The first pixels P1 and the second pixels P2 in the first pixel row R1 are respectively connected to the data lines DL of odd positions. The third pixels P3 and the fourth pixels P4 in the second pixel row R2 are respectively connected to the data lines DL of even positions. In this way, each of the pixels P1-P4 is electrically connected to a specific set of the scan line SL and the data line DL, so that each of the pixels P1-P4 can be independently operated.

Figure 6:
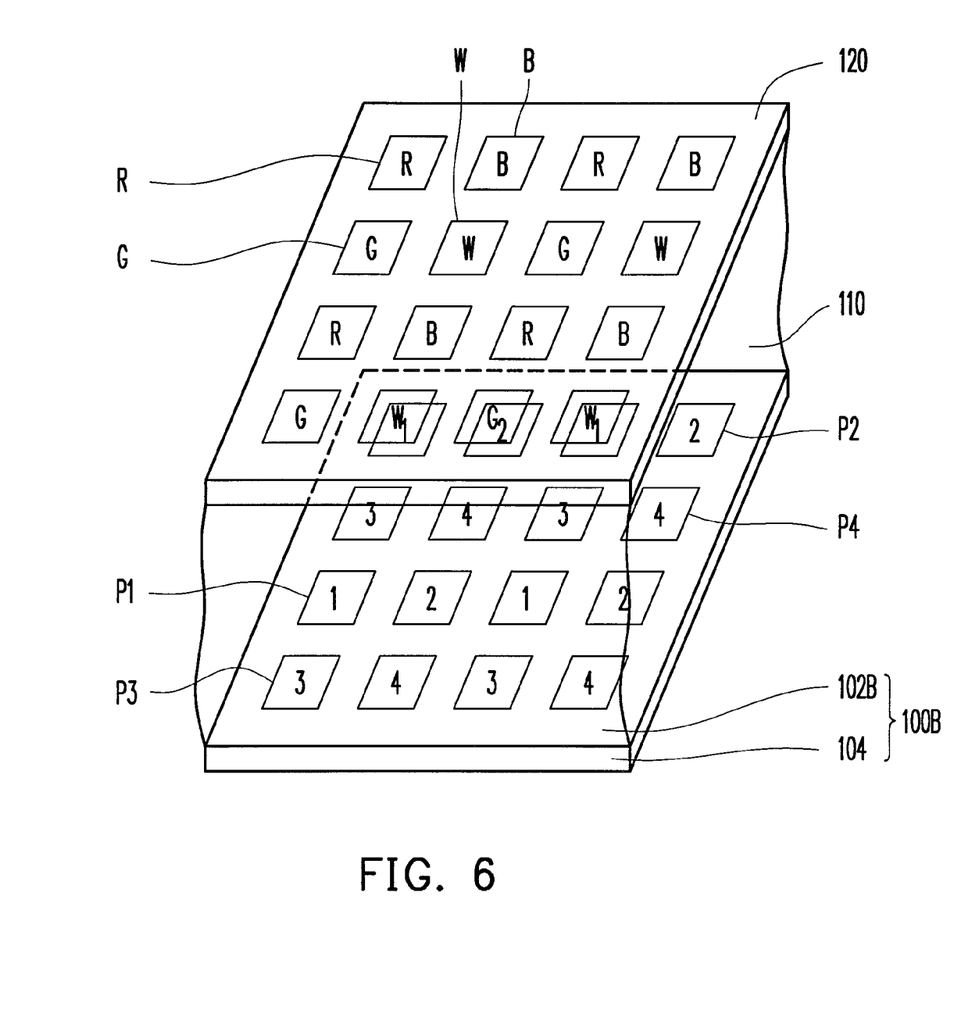
FIG. 6 is a schematic diagram illustrating an active device array substrate and a LCD panel using the pixel array structure of FIG. 5.

FIG. 6 is a schematic diagram illustrating an active device array substrate and a LCD panel using the pixel array structure of FIG. 5. Referring to FIG. 6, the pixel array structure 102B can be fabricated on a substrate 104 to form an active device array substrate 100B. Moreover, the active device array substrate 100B can be applied in a LCD panel, and the LCD panel includes the active device array substrate 100B, a color filter substrate 120 and a liquid crystal layer 110. The color filter layer 120 is opposite to the active device array substrate 100B. The liquid crystal layer 110 is disposed between the active device array substrate 100B and the color filter substrate 120.

Red filter patterns R, blue filter patterns B, green filter patterns G, and transparent filter patterns W of the color filter substrate 120 can respectively correspond to the first pixels P1, the second pixels P2, the third pixels P3 and the fourth pixels P4 in the pixel array structure 102B, so that the first pixels P1, the second pixels P2, the third pixels P3 and the fourth pixels P4 respectively display a red color, a blue color, a green color and a white color.

It should be noticed that in the present embodiment, the fourth pixels P4 correspond to the transparent filter patterns W, which avails improving a transmittance of the LCD panel, so that backlight module materials (for example, light emitting diodes and brightness enhancement films, etc.) required in the follow-up module fabrication process of the LCD panel can be reduced, so as to further reduce the production cost of the follow-up module fabrication process.

According to the above descriptions, the number of the scan lines SL in the pixel array structure 102B can be reduced by a half compared to that of the pixel array structure of the second embodiment, so that when the LCD panel of the present embodiment is operated in a high frequency (a high scan frequency), the problem of inadequate charging time can be resolved.

Moreover, since the pixel array structure 102B of the present embodiment applies a design that one pixel corresponds to one transparent filter pattern, light transmittance thereof is improved, so that backlight module materials (for example, light emitting diodes and brightness enhancement films, etc.) required in the follow-up module fabrication process of the LCD panel using the pixel array structure 102B can be reduced, so as to further reduce the production cost.

In summary, the pixel array structure, the active device array substrate and the LCD panel of the invention has at least following advantages:

By suitably arranging the pixels and designing a layout of the data lines and the scan lines, the number of the data lines can be effectively reduced, so as to reduce a usage number of the high-cost source driver ICs. In this way, the production cost can be greatly reduced. Moreover, the pixel array structure can also apply a design that one pixel corresponds to one transparent filter patter, so that backlight module materials (for example, light emitting diodes and brightness enhancement films, etc.) required in the follow-up module fabrication process of the LCD panel using the pixel array structure can be reduced, so as to further reduce the production cost. In addition, the pixel array structure sharing the same scan lines can also ensure each of the pixels having adequate charging time.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A pixel array structure, comprising:
   a plurality of first pixels, each having an active device, and the first pixels being arranged in a first row;
   a plurality of second pixels, each having an active device, and the second pixels being arranged in a second row;
   a plurality of third pixels, each having an active device, and the third pixels being arranged in a third row; and
   a plurality of scan lines and a plurality of data lines, electrically connected to the corresponding first pixels, second pixels and third pixels through the active devices,
   wherein a first pixel column and a second pixel column are respectively formed at two sides of each data line,
   the first pixels, the second pixels and the third pixels in the first pixel column are connected to the scan lines of odd positions, and
   the first pixels, the second pixels, and the third pixels in the second pixel column are connected to the scan lines of even positions, and each of the pixels further comprises a pixel electrode, and the pixel electrode is electrically connected to the corresponding scan line and the data line through the active device, and a long side of the pixel electrode is parallel to an extending direction of the scan line SL.

2. The pixel array structure as claimed in claim 1, wherein the active device is a thin film transistor.

3. The pixel array structure as claimed in claim 1, wherein each of the pixels further comprises a pixel electrode, and the pixel electrode is electrically connected to the corresponding scan line and the data line through the active device.

4. The pixel array structure as claimed in claim 1, wherein the first pixels display a red color, the second pixels display a green color, and the third pixels display a blue color.

* * * * *